United States Patent
Li et al.

(10) Patent No.: US 9,986,421 B2
(45) Date of Patent: May 29, 2018

(54) SECURE VIRTUAL TRANSFER OF SUBSCRIBER CREDENTIALS

(71) Applicant: Verizon Patent & Licensing Inc., Basking Ridge, NJ (US)

(72) Inventors: Yuk Lun Li, Morganville, NJ (US); Christopher M. Schmidt, Branchburg, NJ (US); Ji Hoon Kim, Lyndhurst, NJ (US); Manuel E. Caceres, Basking Ridge, NJ (US); Paul Berman, Roselle Park, NJ (US); Mohammad Raheel Khalid, Budd Lake, NJ (US); Christian Egeler, Basking Ridge, NJ (US); Taussif Khan, Monroe, NJ (US); David Strumwasser, Branchburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 591 days.

(21) Appl. No.: 14/559,204

(22) Filed: Dec. 3, 2014

(65) Prior Publication Data
US 2016/0164883 A1 Jun. 9, 2016

(51) Int. Cl.
*H04L 29/06* (2006.01)
*H04W 12/04* (2009.01)
(Continued)

(52) U.S. Cl.
CPC ........... *H04W 8/205* (2013.01); *H04W 4/005* (2013.01); *H04W 4/008* (2013.01); *H04W 12/04* (2013.01); *H04W 8/26* (2013.01)

(58) Field of Classification Search
CPC ..... H04W 4/005; H04W 4/008; H04W 8/205; H04W 8/206; H04W 12/04
See application file for complete search history.

(56) References Cited

U.S. PATENT DOCUMENTS

| 5,675,628 A * | 10/1997 | Hokkanen | H04W 8/183 455/433 |
| 2002/0006808 A1 * | 1/2002 | Onaka | H04L 12/14 455/556.1 |

(Continued)

OTHER PUBLICATIONS

Michael Kasper. "Virtualisation of a SIM-Card Using Trusted Computing" reference dated Apr. 30, 2007 (91 pages) http://sit.sit.fraunhofer.de/smv/publications/download/virtualisation-sim-card-final.pdf.*

(Continued)

*Primary Examiner* — Joseph P Hirl
*Assistant Examiner* — Thomas Gyorfi

(57) ABSTRACT

To virtually transfer subscriber identity module ("SIM") credentials from an active device to an inactive device in order to share carrier network access, temporary identifiers and SIM credentials are transferred using secure connections and an optional public-private key pair with encryption at the transport layer. In an example, a carrier identification ("ID") server receives a temporary identifier, such as a temporary international mobile subscriber identity ("TIMSI"), from an inactive device via a carrier network. The carrier ID server authenticates the inactive device using the TIMSI by issuing a network challenge. Next, the carrier ID server verifies with an active device associated with the inactive device that the active device distributed the TIMSI. After authenticating and verifying with both devices, the carrier ID server activates the inactive device by allowing the TIMSI to behave as virtual SIM credentials on the carrier network.

20 Claims, 6 Drawing Sheets

(51) Int. Cl.
*H04W 8/20* (2009.01)
*H04W 4/00* (2018.01)
*H04W 8/26* (2009.01)

(56) References Cited

U.S. PATENT DOCUMENTS

| | | | | |
|---|---|---|---|---|
| 2009/0125996 | A1* | 5/2009 | Guccione | H04L 63/0853 726/6 |
| 2010/0041402 | A1* | 2/2010 | Gallagher | H04W 8/02 455/435.1 |
| 2013/0225123 | A1* | 8/2013 | Adjakple | G06Q 20/322 455/406 |
| 2014/0038601 | A1* | 2/2014 | Gouriou | H04W 8/183 455/435.1 |
| 2014/0086177 | A1* | 3/2014 | Adjakple | H04W 12/08 370/329 |
| 2014/0171027 | A1* | 6/2014 | Arkko | H04L 63/0853 455/411 |
| 2015/0351140 | A1* | 12/2015 | Sonnevi | H04W 8/082 370/329 |
| 2016/0242032 | A1* | 8/2016 | De Kievit | H04L 9/088 |

OTHER PUBLICATIONS

Bart Barton. "LTE and Beyond: IMSI, TMSI, and GUTI—how they are created" Published Feb. 15, 2012 (5 pages) http://www.lteandbeyond.com/2012/02/imsi-tmsi-and-guti-how-they-are-created.html.*

3GPP TS 23.003 V11.6 (Sep. 2013) "3rd Generation Partnership Project; Technical Specification Group Core Network and Terminals; Numbering, addressing, and identification (Release 11)" Published Sep. 2013 (84 pages).*

SIM Access Profile—Interoperability Specification, Car WG, Dec. 18, 2008.

SAP and Remote Network Access, Bluetooth Special Interest Group, Telephony & Car WG, Oct. 23, 2012.

* cited by examiner

US 9,986,421 B2

SECURE VIRTUAL TRANSFER OF SUBSCRIBER CREDENTIALS

BACKGROUND

Generally described, a subscriber identity module ("SIM") is an integrated circuit, used to authenticate subscribers' mobile telephony devices, such as their mobile phones. Each mobile telephony device has a unique international mobile station equipment identity ("IMEI") number to identify the device. Typically, a SIM card is made of plastic and includes a SIM circuit and application. A universal integrated circuit card ("UICC") is a smart card which can be used in global system for mobile communications ("GSM") and universal mobile telecommunications system ("UMTS") networks. A UICC is used in mobile telephony devices and ensures the security of personal data. A SIM card can be considered a type of UICC card. Although there are some technical differences between a SIM card and UICC technology, the differences are not germane to the present disclosure. Thus, the term SIM cards, as used herein, should also be understood to encompass UICC technology.

Since the first full-size SIM card, the card size has become smaller, resulting in so-called mini-SIM, micro-SIMs, and nano-SIMs. Most recently, embedded-SIMs have been developed for mobile to mobile ("M2M") applications. Unlike conventional SIM cards, which can be physically removed quite easily from a mobile device and then transferred to a different device, embedded SIM ("eSIM") cards are soldered directly onto a circuit board during manufacturing. The Apple iPhone® is an example of a mobile device with an eSIM card.

Unfortunately, SIM cards have many shortcomings. For example, an embedded SIM card is not easily ported from device to device. As another example, non-telephony devices, such as computers, tablets, etc., that are not physically configured to receive a SIM card cannot be used on a carrier network that relies on SIM cards for authentication. Consequently, it is difficult for a subscriber to migrate over to different devices when using a carrier network.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
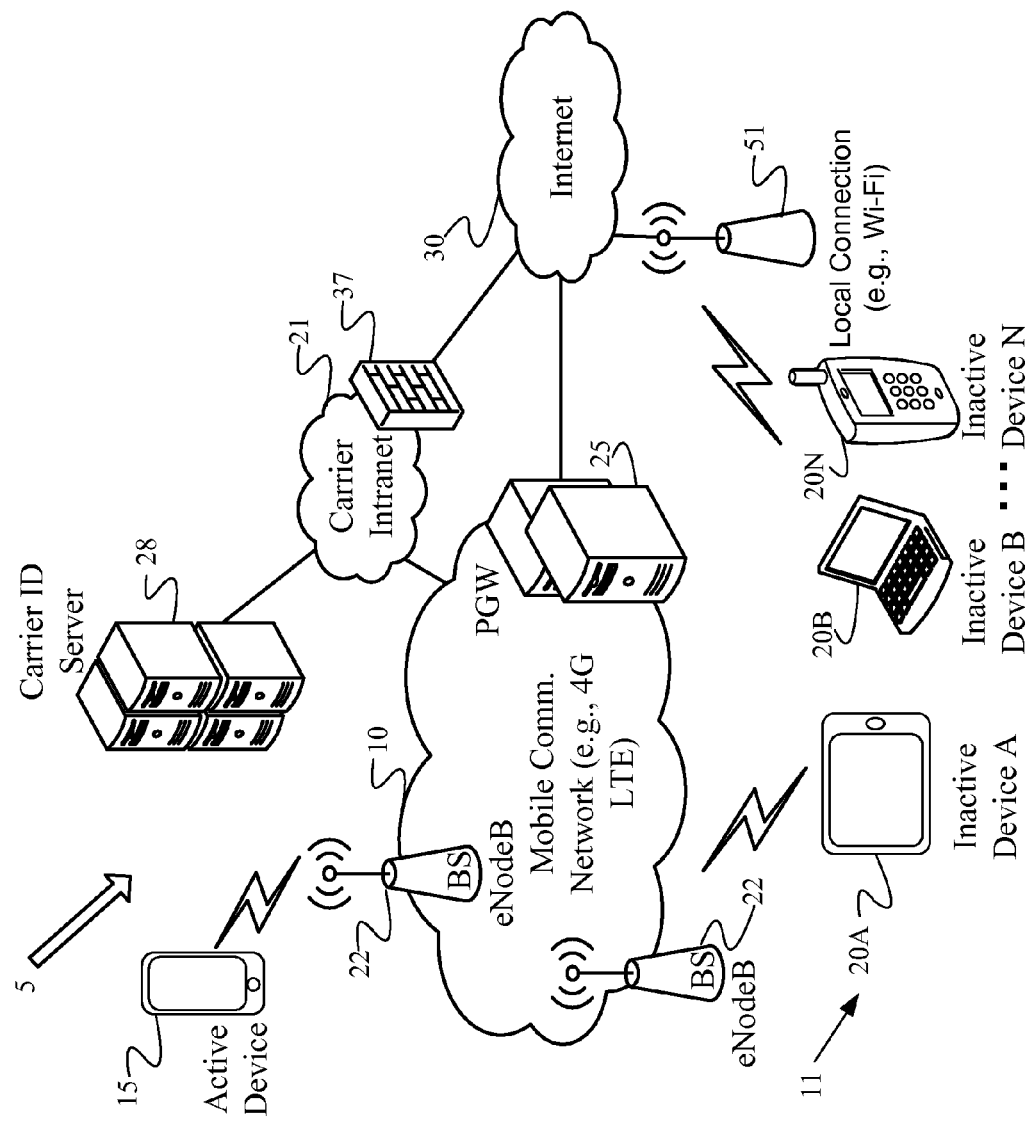
FIG. 1 is a high-level functional block diagram of an example of a system of networks and devices that provide a variety of communication services, including communications in support of securely transferring subscriber credentials.

Reference now is made in detail to the examples illustrated in the accompanying drawings and discussed below. FIG. 1 illustrates a functional block diagram of a system 5 that supports various mobile communication services and implements communications in support of securely transferring subscriber credentials or rights for carrier network access from an active device to an inactive device.

The illustrated system 5 includes a mobile communication network 10, in this case, operated in accordance with fourth generation (4G) Long Term Evolution (LTE) standards, although other wireless networks at least supporting data and voice communications may be used. The 4G LTE mobile network 10 in the example provides mobile telephone communications as well as Internet data communication services. For example, mobile network 10 may connect to public packet-switched data communication networks such as the Internet 30 via a packet gateway (PGW) server 25. Data communications via mobile network 10 with network connected equipment, provided for a user of active device 15, may support a variety of services such as communications of text and multimedia messages, e-mail, web browsing, streaming or downloading content, etc.

In our discussion, the examples use packet communications via a mobile network 10, an Intranet 21 and the Internet 30, which typically would utilize packet transport and Internet Protocol (IP). The credential transfer processing, here, however, can utilize other networks, other forms of network transport, and/or other protocols for the relevant communications. For example, Voice communication may involve transport via the Internet 30 using voice over Internet Protocol (VoIP) technologies; although additional networking equipment (not shown) may be provided for separate voice transport, e.g. if the network 10 utilizes wireless communication technologies offering traditional circuit switched transport for voice telephone type services.

As shown, system 5 includes an active device 15 and one or more inactive devices 20A-N (representative of any number of inactive devices). Active device 15 and inactive devices 20A-N can be laptops, a personal digital assistants ("PDAs"), smartphones, tablet computers, portable games or media players with wireless communication elements, mobile hotpots, in-vehicle gateways, in-home gateways, wearables, e.g., credit cards, watches, necklaces, wristbands, key chains, key fob devices, or other portable devices designed to communicate via one or more wireless networks, including packet-switched or circuit-switched transport networks. The system 5 provides subscribers of a carrier network 10 the flexibility to swap in and out inactive devices 20A-N on the network 10 both securely and virtually so that one set of network access credentials can be shared, at least from time to time, among some number of mobile devices. In the example, the carrier is the entity that operates a network, such as mobile network 10, to provide services to devices 15, 20 of users/subscribers.

Active device 15 wirelessly connects to mobile network 10 through a cellular base station (BS) 22 to communicate, two of which appear in the drawing by way of example. The active device 15 in the example corresponds to a smartphone and includes a SIM card with SIM credentials, such as a Code Division Multiple Access ("CDMA") SIM (collectively, "CSIM"), universal SIM ("USIM"), or IP Multimedia SIM ("ISIM"). The SIM memory securely stores credentials, such as the international mobile subscriber identity ("IMSI") and the related key to identify and authenticate subscribers on the telephony device. The IMSI is a 64-bit field, for example, that includes a mobile country code ("MCC"), mobile network code ("MNC"), and mobile subscriber identification number ("MSIN"). The SIM card also has a unique serial number or integrated circuit card identifier ("ICCID"), the IMSI, security authentication and ciphering information, a list of services the subscriber has access to, passwords, and temporary information pertaining to the network. When in a GSM network environment, the card includes a SIM application. For use in a UMTS network environment, the SIM card may also include a USIM application.

In the illustration, inactive devices 20A-N correspond to a tablet, laptop computer, and mobile phone, respectively. Before the virtual SIM credential transfer process is initiated, inactive devices 20A-N are unable to communicate via network 10 because they lack the requisite SIM credentials necessary for communication on the carrier network 10. In other words, before SIM credentials are transferred, inactive devices 15A-N may have the capability, but are not activated for communication via the public mobile wireless communication network 10. In that state, devices 20A-N, however, have the capability to communicate via other media such as WiFi.

Inactive devices 20A-N are initially in communication with active device 15 via a local connection 51. Local connection 51 is a secure local connectivity channel and takes place using Wi-Fi in the illustration. However, a variety of other communication methodologies can be used, including Bluetooth, near field communication ("NFC"), magnetic induction (e.g., used for wireless charging connections), audio, camera, and other wired connections, such as USB, HDMI, etc. Such Bluetooth, NFC, radio frequency identifier ("RFID"),"), ultrasonic, and infrared transceiver communications take place over short range ("SR") networks. Although any local connection 51 can be used, NFC advantageously allows ease of use, security, and user association. For example, the SIM credential transfer process can be initiated using NFC by tapping active device 15 and inactive devices 20A-N, which provides for an intuitive user experience.

Transferring SIM credentials from active device 15 to inactive devices 20A-N allows the subscriber to easily move his/her telephony account, phone number, and carrier network access from one mobile device to another device. Switching the SIM credentials also transfers the subscriber's phone book and text messages in the example. In contrast to existing SIM credential transfer methodologies, which require SIM credentials to be physically transferred from device to device via transfer of a SIM card, techniques in our examples allow the SIM credentials to be transferred virtually, thereby sharing access to the carrier network while preserving the security of the SIM credentials.

The data can be considered semi-permanently associated with the inactive devices 20A-N or permanently associated with the inactive devices 20A-N. For semi-permanent data asscociation, the SIM credentials can be transferred through a secure authenticated local connection 51. For permanent data association, the key pattern identification vectors, such as SIM credentials, can be transferred using a secure authenticated channel 51, and the inactive devices 20A-N device may also send the key pattern vectors via network 10 to the carrier ID server 28 which performs a look up of the subscriber data and then transfers the subscriber data to the inactive devices 20A-N.

Active device 15 and inactive devices 20A-N have network communication capability and one or more physical elements for providing a user interface. Internally, such devices typically include one or more wireless transceivers for data communication, a processor configured/connected to control device operation, a memory and programming. As discussed more later, these devices also include one or more physical elements for biometric input, and are programmed or otherwise configured to perform various functions involved in securely transferring credentials for carrier network access.

The carrier that operates the network 10 will also utilize a variety of other systems for related purposes, such as network maintenance, accounting and provisioning. In the example, the carrier has another data network, e.g. Intranet 21, that provides data communications for other data systems used by the carrier; and that Intranet 21 has connectivity into the network 10 that provides the actual communications services to the carrier's customers/subscribers. Examples of carrier systems that reside in or communicate via the Intranet 21 include systems for maintaining account records and for processing of network usage data for billing purposes. The Intranet 21 is connected to the Internet 30 via routing and protective gear generally represented by the firewall 37.

For purposes of the present discussion, equipment communicating via the network 21 includes a customer/device identification (ID) server 28 generally representing any of the carrier's system(s) (hereinafter, "carrier ID server"). This equipment can provide data useful for user authentication purposes based on mobile device identification, in some of the examples of transferring SIM credentials to securely share carrier network access with inactive devices 20A-N, as discussed below. There may be one or more computer platforms to perform the functions of the carrier ID server 28, which can provide redundancy and enable handling of a particular expected peak volume of credential transfer transactions.

When the carrier ID server 28 receives credentials, e.g., SIM credentials, IMEI, mobile identification number (MIN), mobile equipment identifier (MEID), mobile directory number (MDN), or the electronic serial number (ESN), the server 28 can access the appropriate subscriber record in a subscriber database via carrier ID server 28 to validate those identifiers. This equipment/subscriber identity database(s) (e.g., an IMSI and IMEI database) is accessible to the central processing unit (CPU) of the carrier ID server 28. For example, the carrier ID server 28 may confirm that the MDN is currently assigned to a device having the hardware ESN, in a manner analogous to validating a mobile device for network operations before allowing the device to launch a user-desired communication through the network 10.

To complete the discussion of FIG. 1, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB 22 and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G LTE type RANs, although such routing and control element(s) are generically included in the broad class of devices that may be used to implement the functionality of network 10 discussed here.

Figure 2:
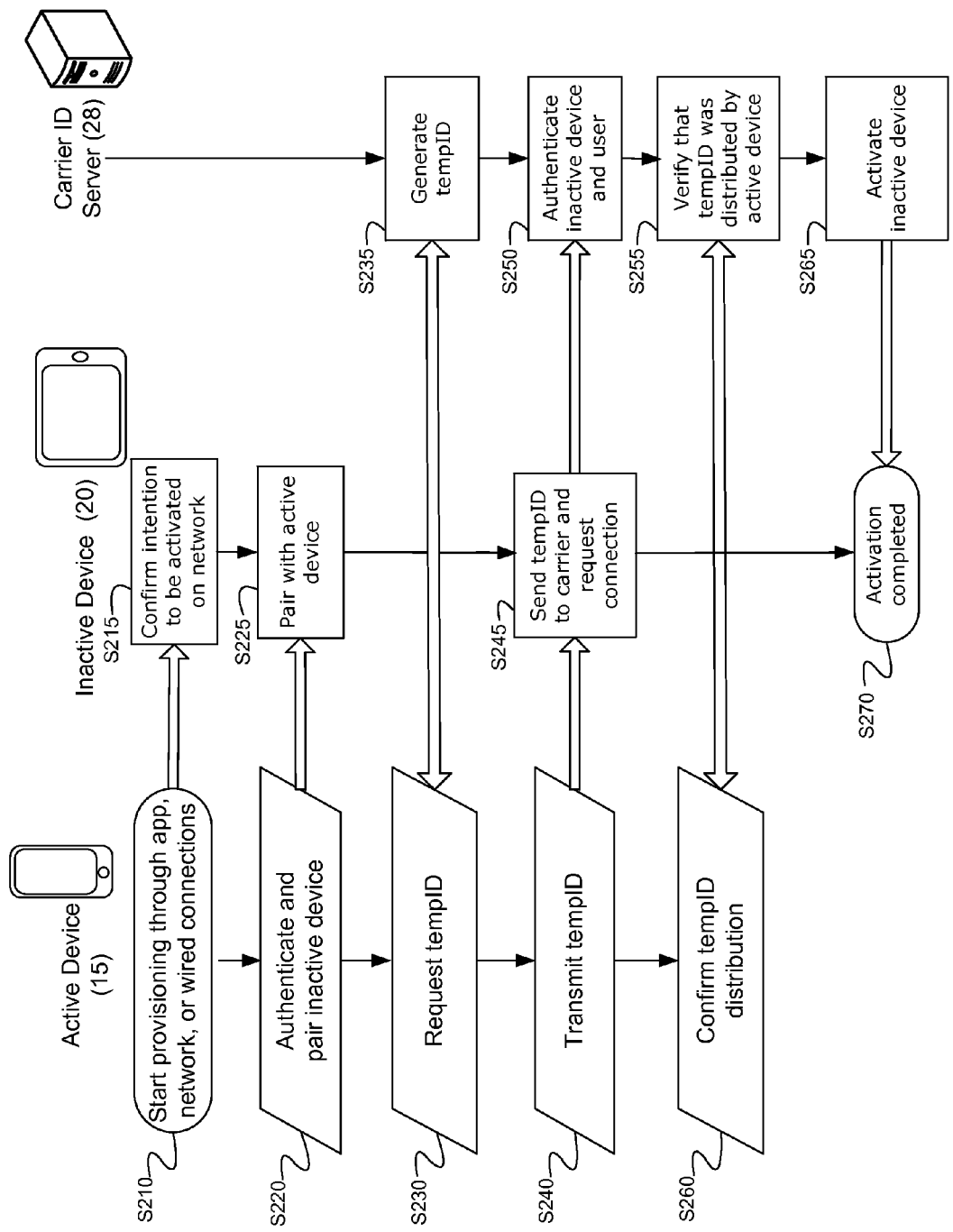
FIG. 2 is a flow chart of a procedure to activate an inactive device on a carrier network.

FIG. 2 illustrates a procedural flow for activation of an inactive device on a carrier network. In the illustrated example, the active device 15 is in direct communication with the carrier network 10 and securely hands over access to the carrier network 10 to the inactive devices 20A-N. The procedure can allow a subscriber to dynamically or virtually switch devices by transferring the data from an active device 15 to another inactive device 20A-N using local connectivity. This provides a substantial benefit over physical switching, sometimes handled by a private branch exchange ("PBX"), which would otherwise initiate a new call and then switch the call from one telephony device to a different telephony device. The present approach also allows call mobility or transfer across various devices, even while a call is active or in progress. As another benefit, the present examples can be used for duplication of content across various devices, such as to duplicate content or data from an active device 15 on secondary inactive devices 20A-N. Duplication may extend to video streaming content, applications, audio, photographs, emails, phone book contacts, etc. The approach also enables sharing of a carrier network connection across multiple subscriber devices, such as shared hotspot carrier service, data connection to a laptop device, and access to a car or conference room when a subscriber enters.

Beginning in step S210, the active device 15 starts provisioning of the inactive device 20. Provisioning may occur using a short range wireless or wired connection, such as Bluetooth, WiFi, NFC, audio, etc. The provisioning process can be initiated through an application user interface, by bringing the devices in close proximity (e.g., walking into a conference room or sitting in a connected car), tapping (e.g., using NFC or RFID action against a device), or using a wired connection (e.g., physically connecting two devices or docking a device with another device). A variety of protocols already exist for detecting proximity, tapping, physical connection, etc.

Moving now to step S215, the inactive device 20 confirms whether the subscriber intends to activate inactive device 20 on a carrier network 10 in response to the initiation of the provisioning process by active device 15. The subscriber's intent can be confirmed by displaying a prompt and receiving user input indicating acceptance. The confirmation step may further include receiving a password or biometric input from the subscriber to accept the transfer or sharing of credentials with inactive device 20.

Continuing now to steps S220 and S225, active device 10 authenticates and pairs with inactive device 20. The authentication in step S220 of the provisioning transaction process can take place using a secure method on the active device 15 to ensure that access by inactive device 20 is authorized, and may involve entry by one or more of a password, biometric data, etc. More specifically, examples of authentication factors can include: fingerprint (determined by sensor on the device); facial recognition (facial image extracted from still or video images taken by the device); passcode (PIN or password entered by touch or speech on the device); speech recognition (voice print entered by speaking to device); gesture (entered by touch on the device or by moving the device). The same authentication factors may be employed during the subscriber confirmation step that takes place on inactive device 20, as discussed earlier.

In one example, the subscriber may confirm his/her intent to activate the inactive device 20 over a short-range network via a touch gesture in step S215. Subsequently, in steps S220 and S225, different authentication factors may be used such as a password entry on the active device 20 (step S220) and fingerprint input on the inactive device 20 (step S225). Accordingly, several layers of different authentication challenges may be used to enhance security.

Pairing in steps S220 and S225 entails recognition of the inactive device 20 by active device 15, and vice versa. The pairing steps can take place over a variety of wireless or wired connections and communication methodologies, such as Bluetooth, WiFi, NFC, audio, etc. For example, when the local connection 51 is via Bluetooth, the devices should be positioned close to each other, usually within a few feet, and the desired device to pair with should be selected. Certain devices, such as an Apple iPhone®, may require entry of the device's passcode during the pairing process.

In step S230, the active device 15 requests temporary identification credentials ("tempID") from the carrier ID server 28. The tempID can be a temporary international mobile subscriber identity ("TIMSI") or temporary IMEI number. In response to receiving the temp ID request, in step S235 the carrier ID server 28 generates a tempID. The tempID can be randomly generated to ensure that the true IMSI identity of the subscriber remains confidential by eliminating the transfer of the IMSI over unsecure channels. The tempID can thus allow the inactive device to be activated based on SIM activation and SIM credentials, while protecting the real IMSI identity of the subscriber.

As discussed above, the tempID can be a TIMSI number. The TIMSI is a virtual number that can be prefixed as a subset of numbers of the parent active device's IMSI number or randomly generated. In one approach, a set of TIMSIs that are associated with the IMSI of the active device 15 are generated. This can advantageously give insight into an inactive device's 20 relationship to the corresponding active device 15 and other inactive devices 20A-N. The TIMSI is typically 4 octets (32 bits) and is generated using an algorithm. The TIMSI can be limited to a geographical area where the active device 15 is positioned; hence, the TIMSI may be updated when the active device 15 moves to a new geographical area. The generated TIMSIs could share a fixed high set of digits that would be fixed to that subscriber and have a low set of digits that would be unique and generated randomly each time the TIMSI is being created. In one example, the upper 3 octets of the set of TIMSIs are fixed to the subscriber's active device 15 and shared by all of the inactive devices 20A-N. On the other hand, the lowest octet varies among each inactive device 20A-N in order to distinguish the devices 20A-N and allow separate communications over the network 10. Based on the matching upper 3 octets, the carrier ID server 28 knows the active 15 and inactive devices 20A-N belong to the same subscriber.

A temporary IMEI or a set of temporary IMEIs of the inactive device 20 can be generated and allocated in the same manner as the TIMSI. When this occurs, the temporary IMEI bears a relationship to the IMEI of the subscriber that is similar to the link shared between the TIMSI of the inactive device 20 and the IMSI of the active device 15. Accordingly, a temporary IMEI or TIMSI of the inactive device 20 can both be linked to the respective IMEI or IMSI of the active device 15, while also allowing separate detachment of the inactive device 20 from the network 10 for security in the event of a network attack.

A subscriber can also change/switch/adapt a device profile of an inactive device 20 by activating the inactive device 20 with a different type of IMEI. For instance, sharing a business type IMEI with a laptop or a phone can switch such inactive devices 20A-N into business mode.

Moving now to step S240, after receiving the tempID from the carrier ID server 28, active device 15 transmits the tempID to inactive device 20. In step S245, inactive device 20 forwards the received tempID to the carrier ID server 28 and requests a connection to the carrier network. 10. In response to receiving the tempID, the carrier ID server 28 authenticates the inactive device 20 and user/subscriber during step S250. For example, carrier ID server 28 may check the tempID against a subscriber identity database to verify that the subscriber has appropriate permissions to activate the inactive device 20. In other words, the carrier ID server 28 confirms that the tempID transmitted by the inactive device 20 is linked to an active device 15 of the subscriber in the subscriber identity database. When the tempID is a TIMSI, for example, the carrier ID server 28 searches for the TIMSI in the subscriber identity database. Upon finding a match, the carrier ID server 28 checks the upper three octets of the TIMSI against the IMSI of the active device 15 to ensure a link exists between the active device 15 of the subscriber and the inactive device 20. Based on the established link, the carrier ID server 28 allows the subscriber to activate the inactive device 20.

Alternatively, or in conjunction with the check against the subscriber identity database, the carrier ID server 28 may issue a network challenge to the inactive device 20 in order to validate the inactive device 20 for network operations before allowing the inactive device 20 to launch a user-desired communication through the network 10. Such a network challenge may be used to support authentication based on a password, such as the tempID, of the subscriber of the active device 15. Instead of transmitting the tempID itself, a hash algorithm, for example, may be used to represent a hash result of the tempID. Since the carrier ID server 28 knows the tempID from the allocation process, the carrier ID server 28 performs the same hash calculation as the inactive device 20. Thus, the hash results generated by the inactive device 20 and carrier ID server 28 are compared instead of the tempID. If a match is found, the carrier ID server 28 allows the subscriber to activate the inactive device 20. The network challenge may involve carrying out Remote Authentication Dial in User Service ("RADIUS"), Challenge-Handshake Authentication Protocol ("CHAP"), Authentication and Key Agreement ("AKA"), or other suitable network challenges.

In steps S255 and S260, the carrier ID server 28 finalizes negotiations with active device 15 to activate inactive device 20. Since the active device 15 is online, in step S255, the carrier ID server 28 checks that the tempID which is being used by inactive device 20 was actually distributed by the associated active device 15. Once a match is made to confirm that the tempID was produced or originated by the active device 15 in step S260, the tempID behaves just like an actual SIM credential, such as USIM, CSIM, or ISIM, to obtain carrier network access 10. In one example, when the tempID is a TIMSI, the TIMSI serves as a virtual IMSI for a certain duration of time, such as two hours. Alternatively, the carrier ID server 28 may impose an expiration time on the TIMSI, or even allow the TIMSI to be refreshed to validate the TIMSI for additional time. Upon completion of the negotiations, in step S265, SIM credentials are sent to the inactive device 20 by carrier ID server 28, thereby completing activation of the device 20 in step S270.

While a termination step is not illustrated in FIG. 2, the same wired, proximity, and physical actions discussed in step S210 can be used to terminate the activation of the (originally inactive) device 20. The activation period of the inactive device 20 can be permanent, time-based, or based on other triggers. In one approach, the inactive device 20 continues to be activated as long as the inactive device 20 is within range or close proximity of active device 15. The range or proximity determination may be based on whether the inactive device 20 remains in communication with active device 15, such as by way of NFC, Bluetooth, etc. Accordingly, the inactive device 20 is deactivated once the originally active device 15 leaves a defined area. Alternatively, the defined area may be a geographical area around or surrounding the inactive device 20. For example, the defined area may specify a particular radius from the geographic location where the inactive device 20 was first activated. As yet another example, the defined area may be a geographical area associated with a particular access point of carrier network 10. For example, the defined area may be a specified radius surrounding the geographical location of an access point name or base station 22 of the carrier network 10 that generated the tempID (e.g., TIMSI) that is being used by the inactive device 20 for access to network 10.

In one approach, termination is initiated based on a timed lease of SIM credentials. When the activation period of the inactive device 20 is time-based, the inactive device 20 can be granted a particular duration of access time to carrier network 10, such as 30 minutes, for example. In yet another example, the activation period of the inactive device 20 is based on its physical or logical connection to active device 15. For example, deactivation may be triggered by physically disconnecting, such as by way of wired connection, or unpairing the inactive device 20 from active device 15, such as by way of an application. In other examples, deactivation may be triggered by a combination of these characteristics.

In an example, where active device 15 is permitted up to five simultaneous device connections, deactivation of inactive device 20 frees up one of the connections for the remaining inactive devices. Accordingly, the tempID, such as the TIMSI, that was previously used by the deactivated device to access the network 10 would be freed up for reallocation to another inactive device or the same inactive device 20 in the future. In one example, each active device 15 may have a fixed pool of tempIDs to issue to inactive devices 20A-N and those tempIDs are stored in the subscriber database. As tempIDs are issued to inactive devices 20A-N, those tempIDs are marked as allocated in the pool. When one of the inactive devices 20A-N is deactivated, the corresponding tempID goes back into the pool of the active device 15 for reallocation to other devices 20A-N.

Figure 3:
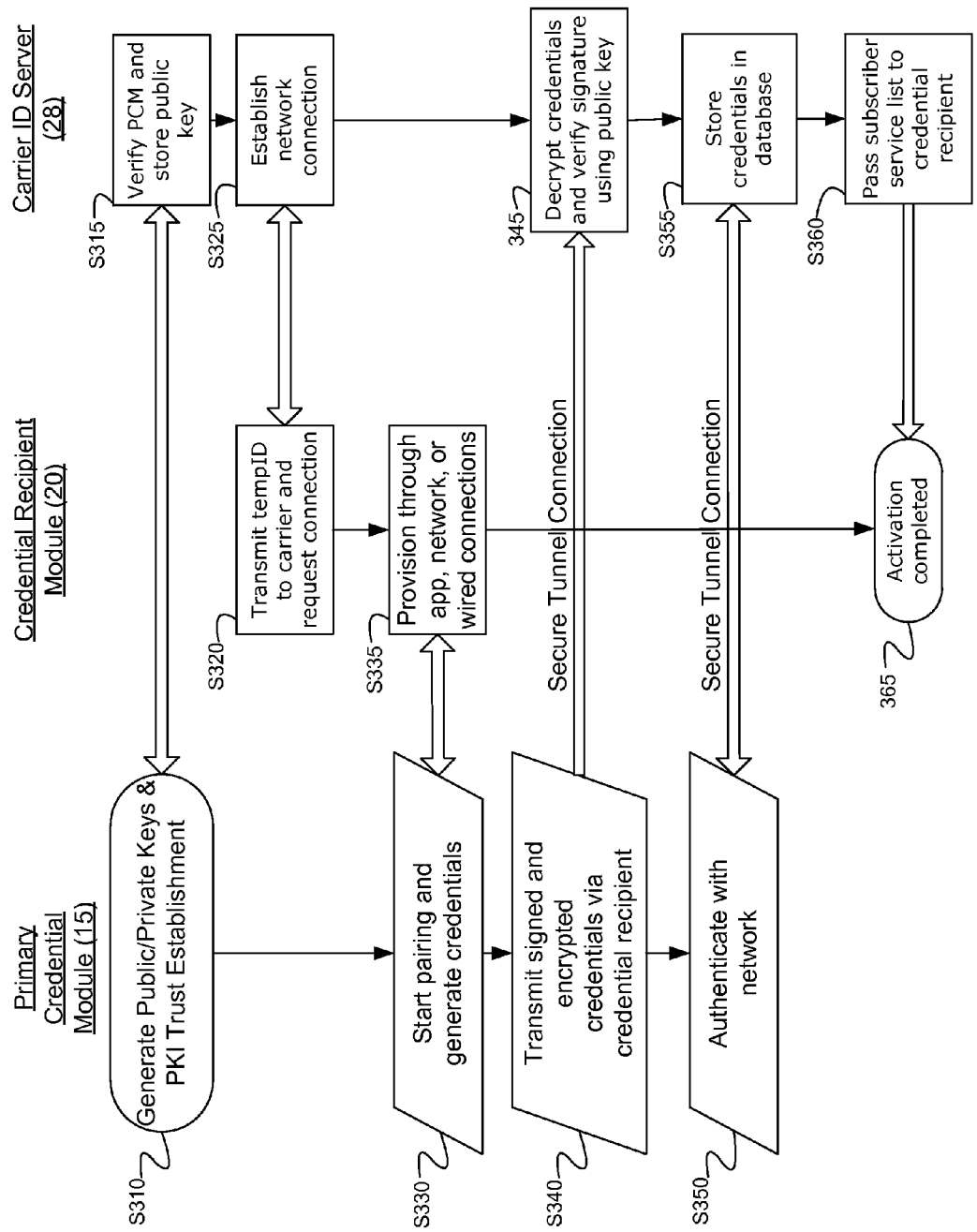
FIG. 3 is a flow chart of a credential establishment procedure for carrier network access.

FIG. 3 is a flow chart of an example of a credential establishment procedure for carrier network access. The active device 10 includes the illustrated primary credential module (see FIG. 4) and the inactive device 20 includes the depicted credential recipient module (see FIG. 5). In the previous example, the active device possessed access to the mobile network 10 to generate a tempID, such as a TIMSI, to hand off to the inactive device 20. In the present example, the primary credential module lacks access to the carrier network 10 upon completion of the initialization stage, and thus generates credentials for the credential recipient using a secure key. In our implementation, any communications that the primary credential module of active device 15 has with the network 10 and carrier ID server 28 after initialization typically take place via the credential recipient module of inactive device 20.

In general, the term "module," as used herein, refers to logic embodied in hardware or software instructions, which can be written in a programming language, such as Java™, C, C++, for example. A software module can be compiled into executable programs or written in interpreted programming languages, such as Perl or Visual Basic script. Software modules may be callable from other modules or themselves. Generally, the modules described herein refer to logical modules that may be merged with other modules or divided into sub-modules despite their physical organization. The modules can be stored in any type of computer readable medium or computer storage device and be executed by one or more general purpose computers. In addition, the methods and processes disclosed herein can alternatively be embodied in specialized computer hardware or an application specific integrated circuit ("ASIC").

During the initialization stage, shown as step S310, a public-private key pair is generated via primary credential module. The primary credential module stores the private key from the key pair and transmits the public key to carrier ID server 28. In step S315, the carrier ID server 28 verifies the identity of the primary credential module and stores the public key with the associated IMSI or IMEI of the active device 15 in the equipment/subscriber identity database.

Alternatively, a separate key generation device (not shown) may be used to generate the public-private key pair. After generation of the key pair, the private key may then be stored/downloaded in the primary credential module and the public key stored/downloaded in the subscriber database at the carrier ID server 28.

In the example, despite initially having the ability to exchange information with the carrier ID server 28, once the initialization stage is complete, primary credential module no longer has access to the carrier network in the example. Beginning in step S320, the credential recipient module transmits a tempID, such as an IMEI, MEID, or another appropriate identifier to the carrier ID server 28 to request a temporary network connection. In this example, the credential recipient module itself has the ability to ask the network 10 if the credential recipient can connect without going through the primary credential module. This can be achieved by allowing a temporary connection, without any mobile subscriber services, until the subsequent verification/authentication steps. The mobile subscriber services, as discussed herein, allow a device to conduct mobile telephone communications and Internet data communications over the network 10. Moving now to step S325, the carrier ID server 28 establishes a network connection with the credential recipient module over network 10 in response to receiving the tempID.

Continuing now to steps S330 and S335, the primary credential module begins the pairing process with credential recipient module, such as via WiFi, Bluetooth, NFC, and the other methodologies discussed above in FIG. 2. After the pairing process, the primary credential module generates SIM credentials, such as a USIM, CSIM, or ISIM credentials based on the primary credential module's own SIM identity, such as the IMSI of the associated active device 15. Next, primary credential module signs the generated credentials using its own private key. Primary credential module may then optionally encrypt the signed credentials, such as by way of secure socket layer ("SSL"), transport secure layer ("TSL"), or another transport layer security protocol using a trusted certificate issued by a certificate authority, such as public-key infrastructure ("PKI") for example.

Moving now to block S340 the primary credential module transmits the signed and optionally encrypted credentials to the carrier ID server 28 via the credential recipient module. Primary credential module connects to the carrier network using a secure tunnel via the credential recipient module in order to establish a secure exchange of the generated credentials. Turning now to steps S345 and S350, upon receiving the credentials through the secure tunnel, carrier ID server 28 verifies the credentials of the credential recipient module by using the public key that was sent during the initialization steps S310, S315. To establish the credentials, the carrier ID server 28 first optionally decrypts the credentials using the associated transport layer security certificate, such as SSL. Carrier ID server 28 then verifies the integrity and digital signature of the credentials using the public key linked to the primary credential module, which can be retrieved from an equipment/subscriber identity database that carrier ID server 28 manages. Using this retrieved public key, carrier ID server 28 determines whether the credentials were genuinely issued or generated by primary credential module.

In step S355, after the carrier ID server 28 verifies the credentials of the credential recipient module, the carrier ID server 28 then stores the decrypted and verified credentials (e.g., USIM type) of the credential recipient module in the equipment/subscriber identity database, along with the associated IMSI or IMEI of the active device 15. Moving now to steps S360 and S365, carrier ID server 28 passes a subscriber service list to the credential recipient module, thereby completing the activation process of the inactive device 20 associated with the credential recipient module on the carrier network 10. During steps S360 and S365, the carrier ID server 28 may optionally generate an IMSI, TIMSI, or other suitable SIM credentials and pass such identifiers to the credential recipient module.

The foregoing approaches can provide a portable method to hold multiple logical IP Multimedia Subsystem ("IMS") identities for multiline scenarios. For example, the active device 15 (e.g., a wearable, such as a watch) can assign a logical IMS line to various inactive devices 20A-N, as well as manage and change the role of the inactive device 20, thereby changing its business or personal identity via assignment of SIM credentials. The procedures can also provision a blank credit card or key fob devices.

Figure 4:
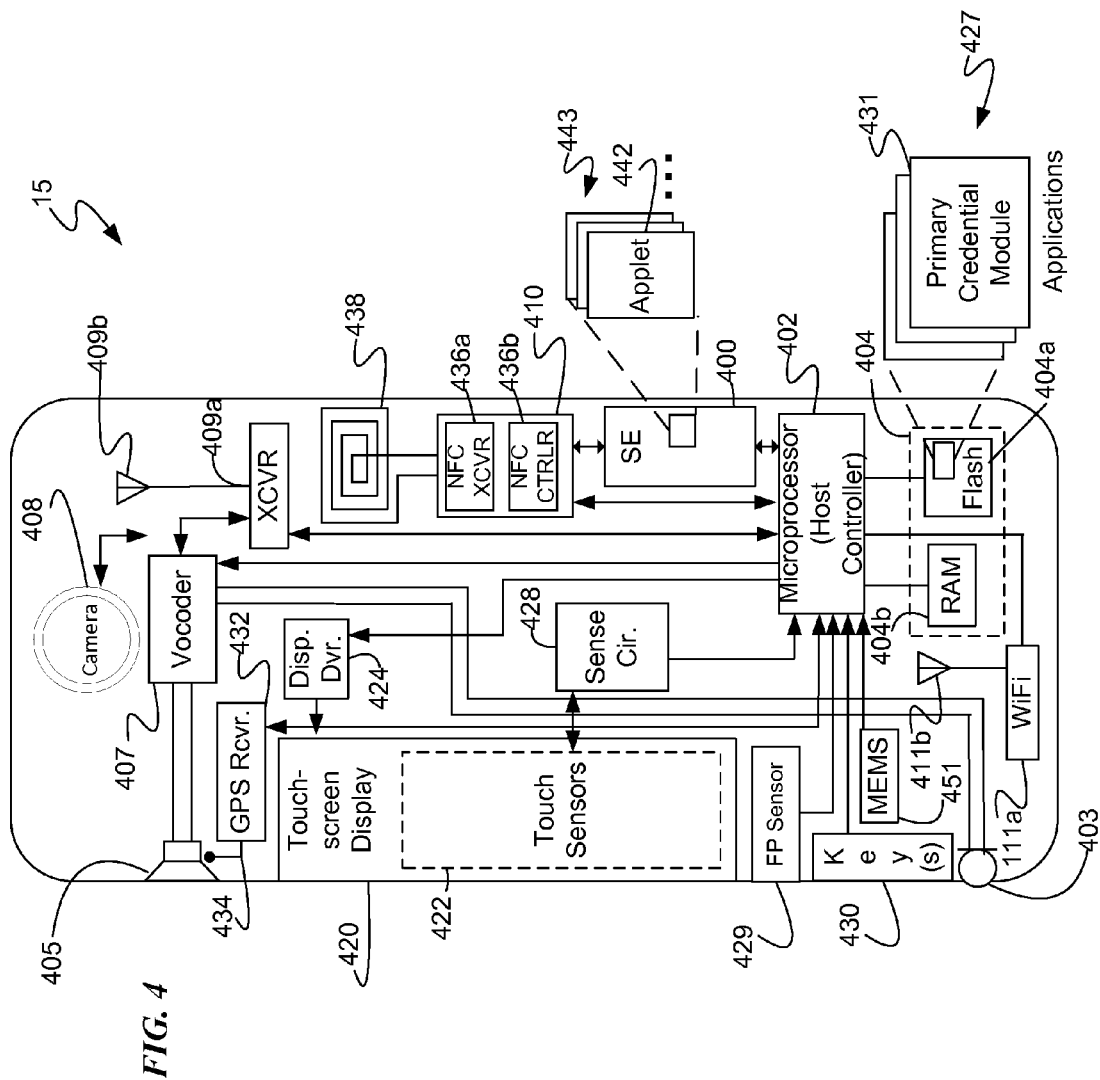
FIG. 4 is a high-level functional block diagram of an active device that communicates via the system of FIG. 1 to securely transfer subscriber credentials.

FIG. 4 illustrates elements of a touch screen type of active device 15, although other non-touch type mobile devices can be used in the secure virtual credential transfer operations under consideration here. Although referred to as an example of an active device, some inactive devices may utilize similar elements. Examples of touch screen type mobile devices that may be used to implement active device 15 may include (but are not limited to) a smart phone, a personal digital assistant (PDA), a tablet computer or other portable device with biometric sensing capability. However, the structure and operation of the touch screen type active device 15 is provided by way of example; and the subject technology as described herein is not intended to be limited thereto. For purposes of this discussion, FIG. 4 therefore provides a block diagram illustration of the example of the active device 15 having a touch screen display for displaying content and receiving user input as (or as part of) the user interface.

Although the transactions that are the focus of discussions here utilize data communications, a typical mobile device such as the active device 15, also supports voice communications. Hence, in the example shown in FIG. 4, the active device 15 includes a microphone 403 for audio signal input and a speaker 405 for audio signal output. The microphone 403 and speaker 405 are communicatively coupled to a voice or audio encoder/decoder (vocoder) 407. For a voice telephone call, for example, the vocoder 407 provides two-way conversion between analog audio signals representing speech or other audio and digital samples at a compressed bit rate compatible with the digital protocol of wireless telephone network communications or voice over packet (e.g., Internet Protocol) communications.

The vocoder, speaker and microphone may also be used as elements of the user interface during other operations of the device, including some types of transaction communications. For example, audible prompts may be output via the speaker. Also, if one of the user authentication factors called for by an applicable rule set involves a speech input, e.g. for voice print verification, the mobile device would receive the user's speech input via the microphone 403, and the vocoder 407 would digitize that speech input for further processing.

Also, as shown in FIG. 4, the active device 15 includes at least one digital transceiver (XCVR) 409a, for digital wireless communications via a wide area wireless mobile communication network, although the active device 15 may include additional digital or analog transceivers (not shown). The transceiver 409a conforms to one or more of the various digital wireless communication standards utilized by modern mobile networks. Examples of such transceivers include (but are not limited to) transceivers configured to operate in accordance with CDMA and 3rd Generation Partnership Project (3GPP) network technologies including, for example and without limitation, 3GPP type 2 (or 3GPP2) and LTE, at times referred to as "4G." For example, transceiver 409a provides two-way wireless communication of information including digitized audio signals, still image and/or video signals, web page information for display as well as web related inputs, and various types of mobile message communications to/from the active device 15.

Several of these types of communications through the transceiver 409a and a network, as discussed previously, relate to the user authentication in support of a secure SIM credential transfer for shared carrier network access. Such communications, for example, may utilize IP packet data transport utilizing the digital wireless transceiver (XCVR) 409a and over the air communications to and from a base station 22, the traffic portion of network 10, the Intranet 21 to and from the carrier ID server 28.

In one example, the transceiver 409a also sends and receives a variety of signaling messages in support of various voice and data services provided by a network of a wireless service provider, to a user of active device 15 via the mobile communication network. Transceiver 409a connects through radio frequency (RF) send-and-receive amplifiers (not shown) to an antenna 409b. Transceiver 409a may also support various types of mobile messaging services, such as short message service (SMS), enhanced messaging service (EMS), and/or multimedia messaging service (MMS). Although transaction communications involving data for sharing carrier network access typically utilize IP data transport, such transaction communications may at times utilize one or more of these mobile messaging services for the data transport of some or all of the relevant data through the mobile communication network 10.

Many modern mobile active devices 15 also support wireless local area network communications over WiFi, instead of or in addition to data communications using the wide area mobile communication network. Hence, in the example of FIG. 4, for packet data communications, the active device 15 may also include a WiFi transceiver 411a and associated antenna 411b. Although WiFi is used here as the example, the transceiver 411a may take the form of any available two-way wireless local area network (WLAN) transceiver of a type that is compatible with one or more standard protocols of communication implemented in wireless local area networks, such as one of the WiFi standards under IEEE 802.11 and/or WiMAX.

The transceiver 411a, for example, may provide two-way data transport for wireless communication with a wireless access point in a residence or enterprise that the user frequents or with any available hotspot offered in a public venue. A WiFi access point, such as that shown as local connection 51 in FIG. 1, communicates with compatible user equipment, such as the active device 15, over the air using the applicable WiFi protocol. The WiFi access point provides network connectivity, usually to the public Internet 30. In a home or office premises, for example, the WiFi access point would connect directly or via a local area network (LAN) to a line providing internet access service. In a more public venue, an access point configured as a hotspot may offer similar connectivity for customers or others using the venue, on terms and conditions set by the venue operator. Although communicating through a different network or networks, the transceiver 411a supports various types of data communications similar to the packet data communications supported via the mobile network transceiver 409a, including communications related to user authentication to and from the carrier ID server 28.

Although not separately shown, another transceiver may be included for short range communication, e.g., in accordance with the Bluetooth standard.

The active device 15 further includes a microprocessor, sometimes referred to herein as the host controller 402. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 402, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in active device 15 or in inactive device 20A-N (e.g. FIG. 5), carrier ID server computers (e.g. FIG. 6), network elements, etc.

Returning more specifically to the active device 15 example of FIG. 4, the microprocessor 402 serves as a programmable host controller for active device 15 by configuring active device 15 to perform various operations, for example, in accordance with instructions or programming executable by processor 402. For example, such operations may include various general operations of the active device 15 as well as operations related to pairing with other inactive devices 20A-N, credential generation, public-private key generation, and negotiations with carrier ID server 28 for activation of inactive devices 20A-N. Although a processor may be configured by use of hardwired logic, typical processors in mobile devices are general processing circuits configured by execution of programming.

The active device 15 includes a memory or storage system 404, for storing data and programming. In the example, the memory system 404 may include a flash memory 404a and a random access memory (RAM) 404b. The RAM 404b serves as short term storage for instructions and data being handled by the processor 402, e.g. as a working data processing memory. The flash memory 404a typically provides longer term storage.

Hence, in the example of active device 15, the flash memory 404a is used to store programming or instructions for execution by the processor 402. Depending on the type of device, the active device 15 stores and runs an operating system through which specific applications may be run on the device. Examples of operating systems include Android, Apple iOS (I-Phone or iPad devices), Windows Mobile, RIM BlackBerry operating system, or the like. Flash memory 404a may also be used to store mobile configuration settings for different mobile applications or services executable at active device 15 using processor 402.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement the device authentication and any other device functions associated with virtually transferring SIM credentials. Program aspects of the technology may be thought of as "products" or "articles of manufacture" typically in the form of executable code or process instructions and/or associated data that is stored on or embodied in a type of machine or processor readable medium (e.g., transitory or non-transitory), such as one of the memories 404a, 404b of memory system 404, or a memory of a computer used to download or otherwise install such programming into the mobile device, or a transportable storage device or a communications medium for carrying program for installation in the active device 15.

In the example, the flash memory 404a stores a number of applications 427 for execution by the microprocessor-based host controller 402, typically through operation/execution of the device operating system. Of note, for purposes of the present discussion, the flash memory 404 stores a primary credential module (app) 431 as one of the programs 427 for execution by the microprocessor 402. For example, the primary credential module 231 may be installed as part of or after the customer has enrolled for the mobile carrier network credential transfer service. Alternatively, the primary credential module 431 may be pre-installed on the active device 15 at manufacture or activation on the network but then configured or provisioned in an appropriate manner for use when the customer completes the enrollment for the mobile network credential transfer service.

In the example, execution of the primary credential module 431 by the microprocessor 402 configures the active device 15 to perform a variety of functions, particularly functions related to the provisioning of inactive devices 20A-N and negotiations for activating inactive devices 20A-N with carrier ID server 28. The primary credential module 431 can cause the active device 15 to pair with the inactive devices 20A-N via NFC. In one implementation, the primary credential module 431 requests a tempID from the carrier ID server 28, sends the temp ID to the inactive device 20, and then negotiates transfer of SIM credentials to the inactive device 20 with the carrier ID server 28. In another implementation, the primary credential module 431 includes or generates a public-private key pair stored in memory 404a to transmit signed and encrypted credentials to a credential recipient module (e.g., inactive device 20). Details of examples of such subscriber credential transfer functions are discussed earlier.

The primary credential module 431 may be an application developed and distributed to one or more active devices 15 owned by various subscribers by the entity operating the carrier ID server 28, e.g. the mobile network carrier in our example; or primary credential module 431 may be an application developed and distributed to a subscriber's active device 15 through an application store, such as Apple iTunes® or Google Play®. Depending on the arrangements between the entities, the primary credential module 431 on the active device 15 may be branded to indicate the identity of one or more of those involved enterprises to the device user. The primary credential module 431 may be a stand-alone application as shown, for example, as would be individual selected by the user for launch as outlined above. The primary credential module 431, however, may have an application program interface (API) which allows other applications to call and launch the primary credential module 431 for SIM credential transfer, e.g. when the user of active device 15 elects to share access to the carrier network 10 with other devices.

Although the functions for virtual credential transfer in the active device 15 are configured by use of a software "application," or "module" in our example, it should be apparent that the software to configure the device to perform the functions under consideration here may be implemented and deployed in other ways. For example, the programming to configure the processor 402 and thus the active device 15 for the subscriber credential transfer may be integrated into the device operating system or otherwise part of the native device programming and pre-installed with the operating system or downloaded as part of an operating system or native programming upgrade.

The user (e.g., subscriber) launches the primary credential module 431, for example, by selecting or touching an icon for that application 431 displayed on the touchscreen display of the active device 15. Start-up of the primary credential module 431 may involve a prompt, input and verification of a security factor received from the device user, such as a password, a spoken audible input (or voice print) or a fingerprint scan. If required by the primary credential module 431 launch procedure, the input factor may be temporarily saved for later use by the primary credential module 431 during its processing of the transaction, for example, when authenticating or negotiating with carrier ID server 28.

In the illustrated example, the active device 15 includes a secure component 400. The secure component 400 (e.g. a secure element or "SE") may be provisioned as a section within the memory 404 or may take the form of a universal integrated circuit card (UICC) located within the active device 15. A common example of a UICC implementation of the SE 400 is a subscriber identity module ("SIM"). As discussed above, the SE provides secure storage for various identifiers associated with the active device 15. The SE typically has a unique identifier and is provisioned for operation of the active device 15 in the network 10 by storage of a MDN and/or MIN assigned to the active device 15 by the carrier network operator.

The secure component contains applications that use secure keys running inside the secure processor. Although similar to other applications, the applications for the secure processor are sometimes smaller and sometimes referred to as applets 443. In an example, primary credential module 431 may be an applet residing in the SE 400. For example, there may be at least one applet 442 to securely transfer credentials for access to network 10. If the user authentication procedure involves unique operations by the SE 400, for example, to sign and encrypt some of the identification factors, such as tempID or other SIM credentials, using a public-private key pair or SSL, then the applets 443 can include a specific applet for the secure processing.

The active device 15 also includes an image input device. Although available for other uses, the imager 408 is another of the elements of the active device 15 that may be used for biometric inputs, including input of user authentication factors, for secure credential transfer. Hence, the processor 402 is coupled to at least one imager 408, which in a typical example is a digital camera. Although the drawing shows a single imager/camera 408, for convenience, it should be appreciated that the active device 15 may have two or more cameras. Many such devices 15 today include front and rear facing cameras. Also, active device 15 may have multiple cameras on the front and/or rear side, for example, to support three-dimensional (3D) imaging applications for authentication and other applications.

An active device 15 supporting virtual credential transfer transactions of the type under consideration here may include a variety of different types of physical user interface elements. For discussion purposes, in the active device 15 shown in FIG. 4, the physical user interface elements of active device 15 include a touch screen display 420 (also referred to herein as "touch screen 420" or "display 420"). For output purposes, the touch screen 420 includes a display screen, such as a liquid crystal display (LCD) or the like. The display may be used for part of the user interaction during user authentication in credential transfer procedures, e.g. to display icons or other information to prompt the user to input one or more of the user authentication factors called for by an applicable authentication rule set. For input purposes, touch screen display 420 includes a plurality of touch sensors 422. Touch sensors 422 may be used as a biometric sensor that captures a biometric factor, e.g., a touch gesture. Some touch screens incorporate a fingerprint sensor that may be used as another biometric authentication factor input.

Other user interface or biometric input elements may include the imager/camera 408 and a keypad including one or more keys 430. As noted earlier, the camera/imager 408, for example, may be used as a biometric sensor that captures a biometric factor, e.g., an image of the user's face or a retina.

A keypad may be implemented in hardware as a physical keyboard of active device 15, and keys may correspond to hardware keys of such a keyboard. Alternatively, some or all of the keys 430 (and keyboard) of active device 15 may be implemented as "soft keys" of a virtual keyboard graphically represented in an appropriate arrangement via touch screen display 420. The soft keys presented on the touch screen display 420 may allow the user of active device 15 to invoke the same user interface functions as with the physical hardware keys for authentication purposes.

In some implementations, the microphone 403 and speaker 405 may be used as additional user interface elements, for audio input and output, including with respect to some functions related to the credential transfer processing and communication, as described herein. As noted, another input for an authentication factor would be a speech input via the microphone 403, either for voice print recognition of the user of for speech input of a passcode.

In general, touch screen display 420 and touch sensors 422 (and one or more keys 430, if included) are used to provide a textual and graphical user interface for the active device 15. In an example, touch screen display 420 provides viewable content to the user at active device 15. Touch screen display 420 also enables the user to interact directly with the viewable content provided in the content display area, typically by touching the surface of the screen with a finger or an implement such as a stylus. For example, when an icon of a face is displayed by the primary credential module 431, to prompt user input of a facial image, the user can touch the face icon to activate the camera 408 for the appropriate input of the currently required facial image type user authentication factor.

In some implementations, touch screen display 420 is a capacitive touch screen display, and touch sensors 422 are independent capacitors arranged as a grid and disposed at various points throughout a transparent conductive material (e.g., indium tin oxide) that is layered onto a hard surface composed of insulating material (e.g., glass). As another example, the respective locations of touch sensors 422 (e.g., capacitors) may correspond to different intersection points of a matrix of rows and columns of the layered conductive material. Alternatively, touch sensors 422 may include a grid of capacitive electrodes formed of one or more layers of transparent conductive material etched onto a sheet of hard insulating material, as described above. However, it should be noted that touch screen display 420 is not limited to either of the above-described implementations. Accordingly, touch screen display 420 may be implemented using any of various conventional or other techniques based on, for example, the type of touch screen technology desired for a particular implementation of an active device 15.

User input via the touch screen display 420 includes touch of the display device with the user's finger, stylus or similar type of peripheral device used for user input with a touch screen. At least in some capacitive screen examples, when current is applied to touch screen display 420, user input can be detected by touch sensors 422 based on a measurable change (e.g., reduction) in mutual capacitance based on measurable changes in capacitance and voltage at one or more individual sensor locations corresponding to the physical point(s) of contact of the user's finger(s) or conductive stylus with respect to touch screen display 420.

As shown in FIG. 4, the active device 15 also includes a sense circuit 428 coupled to touch sensors 422 for detecting the occurrence and relative location/position of each touch with respect to a content display area of touch screen display 420. In this example, sense circuit 428 is configured to provide processor 402 with touch-position information based on user input received via touch sensors 422. In some implementations, processor 402 is configured to correlate the touch position information to specific content being displayed within the content display area on touch screen display 420. The touch-position information captured by the sense circuit 428 and provided to processor 402 may include, but is not limited to, coordinates identifying the location of each detected touch with respect to the display area of touch screen display 420 and a timestamp corresponding to each detected touch position.

The information provided by the sense circuit 428 may include, for example, a series of different locations of touch points/positions detected across the content display area of touch screen display 420 over a predetermined period of time. The location and time information for a series of continuous touch points/positions can be used by processor 402 to track the movement of the user's finger(s) (or other input device) across the touch screen display 420. This information also may be used to track various parameters including, but not limited to, the direction and speed of finger movement based on changes between the different touch positions over time. The information tracked by the sense circuit 428 is used by processor 402 to detect various points of touching as well as different types of touch gestures, for enabling the processor and thus the active device 15 to perform operations in accordance with each touch or touch gesture. For example, the active device 15 may utilize such touch sensing and processing technology to detect a touch gestural input as another type of biometric input for a factor for user authentication during a credential transfer procedure.

Another type of gestural detection that may be used as an input for a factor for user authentication is detection of movement of the active device 15 itself. Hence, the illustrated example of an active device 15 also includes one or more motion sensors, such an accelerometer and/or a gyroscope and associated circuitry for signaling microprocessor 402 in response to detected motion input, which are implemented in the example by a Micro-Electro-Mechanical System (MEMS) 451.

The detected motion input may include, for example, a change in orientation of the physical device within three-dimensional space, as well as a determined rate of change in position of the device, in this way, active device 15 can use motion sensing by sensors of the MEMS 451 to monitor and track the detected motion or physical movement of the device 15. The tracked motion detected by MEMS sensing can be used by microprocessor 402 to determine whether the rate of such movement corresponds to a pattern of movement associated with the predetermined physical gesture. The primary credential module 431 in turn can cause the active device 15 to issue a prompt and subsequently obtain motion detection from the MEMS 451 as an indication of gestural movement of the device 15 by the current user, for use as a user authentication factor in the virtual credential transfer processing.

Another type of input element usable for authentication factor input is the fingerprint (FP) sensor 429. Although a camera such as 408 might be used for fingerprint sensing, a number of models of mobile devices today come equipped with a separate scanner or sensor for detecting a fingerprint as a user touches or moves their finger across the sensor 429. As noted, a fingerprint sensor may also be implemented as an element of or in combination with the touch sensors of the touch screen display.

The user interface capabilities of the active device 15 provide output to and receive input from the user of the active device 15, for any of the various functions, operations or applications of the device. For example, the primary credential module 431 configures the active device 15 to prompt for and obtain various user inputs for secure credential transfer for network access. These inputs include identifiers and credential related information as well as subscriber authentication factors. The subscriber will input authentication factors via the appropriate hardware elements at appropriate points during the credential transfer procedure, such as via the user operating an input element such as the touch screen. In some cases, the relevant credential transfer information may be input other ways, for example, via communications with equipment or systems, such as carrier ID server 28.

As an example supporting short range wireless communication for provisioning or pairing during credential transfer procedures, the illustrated active device 15 has NFC capability. NFC is a set of standards for smart phones and similar devices, such as the active device 15 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile device includes a transceiver configured to communicate with other NFC capable equipment.

The illustrated active device 15 further includes an NFC sensor. The NFC sensor may be implemented in a variety of ways. In the active device 15 of FIG. 4, the NFC sensor includes an NFC type radio frequency transceiver 436*a*, which is formed by an NFC chipset 410. The NFC chipset 410 provides two-way wireless communication of information in accordance with NFC technology and protocols. The NFC chipset 410 includes an NFC controller 436*b*. For simplicity, the NFC chipset 410 is sometimes referred to herein as the NFC controller or module 410, while it will be understood that there is a controller 436*b* within the NFC chipset 410. The NFC sensor also includes an antenna, such as coil antenna 438. The NFC chipset 410 of active device 15 connects to the NFC coil antenna 438, for transmitting and receiving NFC communications to/from other NFC compatible devices with compatible transceivers over short air link distances. The transceiver 436*a* formed by the NFC chipset 410 also sends and receives a variety of signaling messages for establishing NFC links with other NFC-enabled devices and sends and receives various user data over the established NFC links. The signaling, for example, may allow the transceiver formed by the NFC chipset 410 to detect proximity of another NFC capable device, establish an NFC link with the other device, trigger execution of an appropriate application within the active device 15 and send and/or receive data for the application as between the active device 15 and the other NFC capable device.

Some modern mobile devices are already equipped with such NFC equipment, and increased NFC deployment is expected in the future. Such NFC communication is another form of communication that may be involved in a credential transfer. For example, if bumped with a NFC capable inactive device, the ID transmission from the active device may then use NFC.

There are a variety of ways that active device 15 may be configured to obtain information as to current location of the device. In one example, the active device 15 includes a global positioning satellite (GPS) receiver 432 and associated antenna 434. GPS is a space-based satellite navigation system that provides location and time information anywhere on Earth, where there is an unobstructed line of sight to at least three of the GPS satellites. The mobile network may provide information to assist in a GPS based location determination. Also, the mobile device may be configured to determine its location in other ways, for example, when GPS determination is unavailable (e.g. when signals are blocked by building structures or the like. The primary credential module 431 may configure the active device 15 to determine its location when pairing with inactive devices 20A-N or determine whether to terminate a previously successful transfer of credentials, as discussed earlier. The structure and operation of the active device 15, as outlined above, were described by way of example only.

Figure 5:
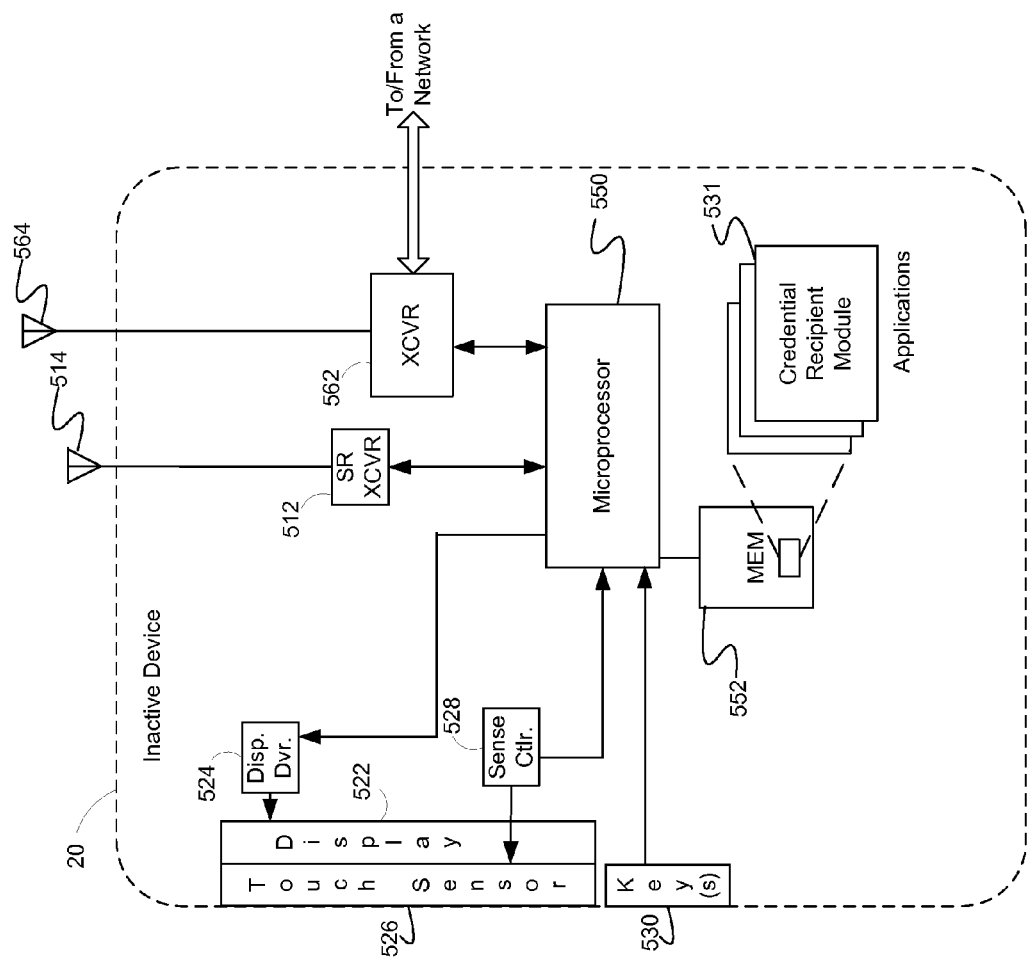
FIG. 5 is a high-level functional block diagram of an inactive device that communicates via the system of FIG. 1.

FIG. 5 is a block diagram of an inactive device 20 that communicates in the system of FIG. 1. By way of example, the inactive device 20 may be implemented as a tablet computer including many of the same elements as the active device 15 of FIG. 4.

The inactive device 20 shown in FIG. 5 includes a display 522 and touch sensor 526 controlled by display driver 524 and sense control circuit 528 respectively. The inactive device 20 may also include keys 530 that provide additional input. Although they may be arranged/sized somewhat differently, the elements 522 to 528 are generally similar to the display, touch sensor, display driver and sense control circuit discussed above relative to the mobile active device 15 example of FIG. 4. Of course other user interface hardware components may be used in place of or instead of the display, touch sensor and keys, depending on the expected type of inactive device 20A-N (e.g., wearable devices).

Like the earlier equipment examples, inactive device 20 includes one or more processor circuits implementing a CPU functionality for data processing and operational control. Although a microcontroller or other type of processor circuit may be used, in the example, the CPU processor of the inactive device 20 takes the form of a microprocessor 550. The structure of the microprocessor 550 may be similar to that of microprocessors discussed earlier.

Programs and data for the microprocessor 550 are stored in a memory 552. Similar to the active device 15, the memory 552 may include both random access memory and flash memory, or even a SE, although fixed implementations of the inactive device 20 can be less constrained by the size and power constraints for mobile devices and therefore can use a wider variety of memory types to best suit the expected functionality of the inactive device 20 type. However, similar constraints can exist when the inactive device 20 is a wearable device or the like.

The inactive device 20 also includes a short range transceiver 512 coupled to an antenna 514. The short range transceiver 512 may include one or more of a Bluetooth transceiver, a Bluetooth low-energy (BLE) transceiver, an NFC transceiver, a radio frequency identifier (RFID) transceiver, an ultrasonic transceiver or an infrared transceiver. Furthermore, although it is shown as a transceiver, it may be a receiver instead. In an implementation discussed with respect to virtual credential transfer, the short range transceiver 512 includes a NFC transceiver. The NFC elements of inactive device 20 may be generally similar to the NFC elements 410, 438 of the active device 15 example of FIG. 4.

The inactive device 20 also includes a data communication interface for packet data communication, shown as a transceiver (XCVR) 562, which is coupled to antenna 564. Transceiver 562 engages in digital wireless communications via a wide area wireless mobile communication network or using WiFi. Transceiver 562 allows the inactive device 20 to communicate with active device 15 and server systems, such as carrier ID server 28. In addition, the inactive device 20 may include additional digital or analog transceivers (not shown).

The keys 530, display driver 524, sense control circuit 568, transceiver 562, short range transceiver 516 and memory 552 are all coupled to the microprocessor 550. Operation of inactive device 20 is controlled by microprocessor execution of programming from the memory 552. In the illustration, memory 552 includes credential recipient module 531 to conduct communications and processing for secure network credential transfer to the inactive device 20, as discussed in the earlier procedures.

Figure 6:
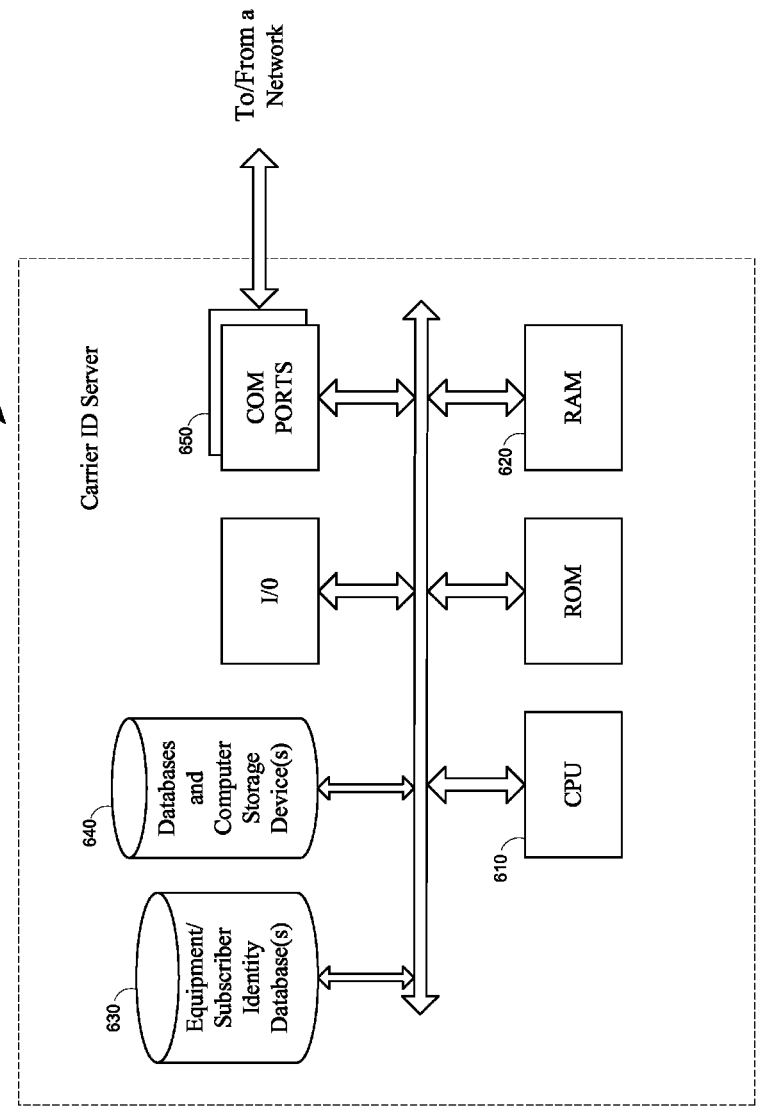
FIG. 6 is a simplified functional block diagram of a computer that may be configured as a server or host, for example, to function as any of the computer platforms for carrier identification ("ID") server shown in the system of FIG. 1.

FIG. 6 illustrates a network or host computer platform, as may typically be used to implement a server, such as the carrier ID server 28 of system 5 in FIG. 1.

The carrier ID server 28 includes a CPU 610, in the form of one or more processors, for executing program instructions. Although the processor(s) forming the CPU 610 may be similar to the microprocessor used in the active device 15 of FIG. 4, host or server computer platforms typically use somewhat different circuit architectures, e.g. to provide more processor power. Carrier ID server 28 also includes a memory 620, shown as RAM, that is accessible to the processor to execute various programming instructions. The memory 620 typically stores programming, such that execution of the programming by the processor configures the carrier ID server 28 to perform the functions or procedures as described above. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In this particular example, the carrier ID server 28 is shown as including the equipment/subscriber identity databases 630 discussed earlier. This equipment/subscriber identity database(s) 630 (e.g., an IMSI and IMEI database) is accessible to the central processing unit (CPU) of the carrier ID server 28. Additional databases and computer storage device(s) 640 are also accessible, such as those storing a public key associated with the subscriber's active device.

As outlined earlier, the secure credential sharing processing effectuated by carrier ID server 28 involves receiving identity and credential data from active device 15 for authentication purposes as well as authenticating and provisioning inactive devices 20A-N with SIM credentials. The data may be obtained in several different ways, including from active device 15 or via inactive device 20.

For packet data communication, carrier ID server 28 includes a data/network communication interface, shown generally as com ports 650. The com ports 650 may use any available data communication technology. In a fixed installation, for example, the com ports 650 may include an Ethernet interface card for communication over appropriate data network wiring. For a wireless implementation, the com ports 650 may include a WiFi transceiver. The com ports 650 allow the carrier ID server 28 to communicate with other devices and systems, such as active device 15 and inactive devices 20A-N.

Aspects of the methods of secure transfer of credentials to access a carrier network as outlined above may be embodied in programming, for example, for one or more server and/or for mobile devices. Program aspects of the technology may be thought of as "products" or "articles of manufacture" typically in the form of executable code and/or associated data that is carried on or embodied in a type of machine readable medium. Executable code, for example, may take the form of software, firmware, microcode or the like of a type suitable for execution by the particular processor hardware of the active device, inactive devices, or server platform (e.g., carrier ID server 28), so as to configure the respective equipment to perform functions like those discussed herein.

"Storage" type media include any or all of the tangible memory of the computers, mobile devices, processors or the like, or associated modules thereof, such as various semiconductor memories, tape drives, disk drives and the like, which may provide non-transitory storage at any time for the programming. All or portions of the programming may at times be communicated through the Internet or various other telecommunication networks. Such communications, for example, may enable loading of the software from one computer or processor into another, for example, from a management server or host computer of the carrier or other enterprise offering the credential transfer service into the computer platform of the carrier ID server 28, downloading the primary credential module 431 into the active device 15, or downloading credential recipient module 531 into the inactive devices 20A-N. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s), mobile devices or the like, such as may be used to implement the secure payment processing techniques discussed herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A carrier identification ("ID") server device comprising:
  a memory including instructions; and
  a processor to execute the instructions to:
    receive, from an active device, a request for a temporary identification;
    generate a first temporary international mobile subscriber identity ("TIMSI") based on receiving the request;
    send the first TIMSI to the active device;
    receive a second TIMSI from an inactive device via a carrier network;
    authenticate the inactive device based on the second TIMSI matching the first TIMSI;
    verify, based on the second TIMSI matching the first TIMSI, that the active device distributed the second TIMSI; and
    activate, based on authenticating the inactive device and verifying that the active device distributed the second TIMSI, the inactive device by allowing the second TIMSI to behave as virtual subscriber identity module ("SIM") credentials on the carrier network.

2. The carrier ID server device of claim 1, wherein the first TIMSI is an identifier that is linked to an international mobile subscriber identity ("IMSI") of the active device.

3. The carrier ID server device of claim 2, wherein the processor is further to:
allocate, before receiving the second TIMSI from the inactive device, a set of TIMSIs associated with the IMSI of the active device on the carrier network,
the set of TIMSIs including the first TIMSI.

4. The carrier ID server device of claim 3, wherein each of the set of TIMSIs comprise a fixed high set of digits corresponding to the IMSI of the active device.

5. The carrier ID server device of claim 3, wherein each TIMSI of the set of TIMSIs have a low set of digits that are randomly generated during allocation of the set of TIMSIs.

6. The carrier ID server device of claim 1,
wherein the active device is paired with the inactive device over a short range network; and
wherein the first TIMSI is sent from the active device to the inactive device over the short range network based on the active device being paired with the inactive device.

7. The carrier ID server device of claim 6, wherein the active device is paired with the inactive device based on the inactive device being detected to be in proximity of the active device.

8. The carrier ID server device of claim 2,
wherein the active device is paired with the inactive device; and
wherein the processor, when generating the first TIMSI, is to:
generate the first TIMSI based on the IMSI of the active device and based on the active device being paired with the inactive device.

9. The carrier ID server device of claim 1, wherein the active device is paired with the inactive device via near field communication.

10. The carrier ID server device of claim 1, wherein the active device is paired with the inactive device via a WiFi connection.

11. A method comprising:
receiving, by a carrier identification ("ID") server device and from an active device, a request for a temporary identification;
generating, by the carrier ID server device, a first temporary international mobile subscriber identity ("TIMSI") based on receiving the request;
sending, by the carrier ID server device, the first TIMSI to the active device;
receiving, by the carrier ID server device, a second TIMSI from an inactive device via a carrier network;
authenticating, by the carrier ID device, the inactive device based on the second TIMSI matching the first TIMSI;
verifying, by the carrier ID device and based on the second TIMSI matching the first TIMSI, that the active device distributed the second TIMSI; and
activating, by the carrier ID device, based on authenticating the inactive device, and based on verifying that the active device distributed the second TIMSI, the inactive device by allowing the second TIMSI to behave as virtual subscriber identity module ("SIM") credentials on the carrier network.

12. The method of claim 11, wherein the first TIMSI is an identifier that is linked to an international mobile subscriber identity ("IMSI") of the active device.

13. The method of claim 12, further comprising:
allocating, before receiving the second TIMSI via the carrier network, a set of TIMSIs associated with the IMSI of the active device on the carrier network,
the set of TIMSIs including the first TIMSI.

14. The method of claim 13, wherein each TIMSI of the set of TIMSIs comprise a fixed high set of digits corresponding to the IMSI of the active device.

15. The method of claim 14, wherein each TIMSI of the set of TIMSIs comprise a low set of digits that are randomly generated during allocation of the set of TIMSIs.

16. The method of claim 11,
wherein the active device is paired with the inactive device over a short range network; and
wherein the first TIMSI is sent from the active device to the inactive device over the short range network based on the active device being paired with the inactive device.

17. The method of claim 11, wherein the active device is paired with the inactive device based on the inactive device being detected to be in proximity of the active device.

18. The method of claim 12,
wherein the active device is paired with the inactive device; and
wherein generating the first TIMSI comprises:
generating the first TIMSI based on the IMSI of the active device and based on the active device being paired with the inactive device.

19. The method of claim 11, wherein the active device is paired with the inactive device via near field communication.

20. The method of claim 11, wherein the active device is paired with the inactive device via a WiFi connection.

* * * * *